S. GANELIN.
PROCESS OF TREATING COMPLEX ZINC LEAD ORES.
APPLICATION FILED MAY 6, 1919.
1,396,740.
Patented Nov. 15, 1921.
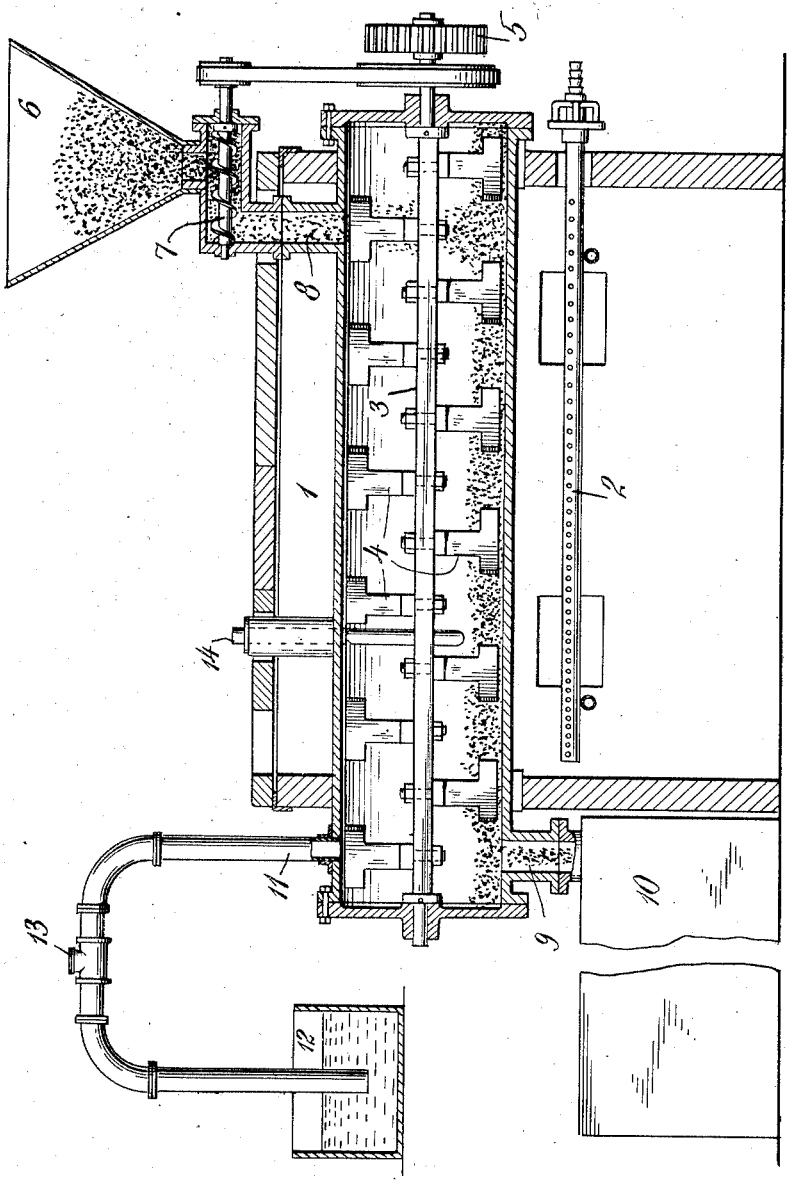
INVENTOR
Soloman Ganelin

UNITED STATES PATENT OFFICE.

SOLOMON GANELIN, OF BROOKLYN, NEW YORK.

PROCESS OF TREATING COMPLEX ZINC-LEAD ORES.

1,396,740. Specification of Letters Patent. Patented Nov. 15, 1921.

Application filed May 6, 1919. Serial No. 295,165.

*To all whom it may concern:*

Be it known that I, SOLOMON GANELIN, a citizen of the United States, residing at Brooklyn, New York, in the county of Kings, State of New York, have invented certain new and useful Improvements in Processes of Treating Complex Zinc-Lead Ores; and I do hereby declare the following to be a full, clear, and exact description of the invention, such as will enable others skilled in the art to which it appertains to make and use the same.

This invention relates to the recovery of lead and silver and blende from complex ores and metallurgical or metalliferous products and relates more especially to the treatment of lead-zinc ores or lead-zinc products often associated in nature with silver or pyrites or both.

This invention relates in the first place to the treatment of sulfid ores and products but can also be easily adapted for treatment of such materials in which the lead and silver are in form of oxids or carbonates or in which the lead and silver are combined with antimony or arsenic.

The object of present invention is not only the recovery of lead and silver from the mentioned materials but also the recovery of a lead free blende the same freed also from the most of the associated pyrites.

The presence of too much pyrites renders difficult and inexpedient the treatment of the resulting blende while a lead free blende is important because such a blende yields lead free products such as lead free spelter or lead free zinc oxid which are increasingly important in the arts and industries particularly in the manufacture of brass for certain purposes such as spinning brass and cartridge cases while zinc oxid free from lead is an essential in the rubber industry.

A further object of present invention is to separate and remove from the ore all and any antimony or arsenic which are often present in lead-zinc ores and which then contaminate both the lead and the zinc deriving from such ores. The object of this invention is rather to recover the lead as well as the blende in a particularly pure state so that neither lead nor the zinc subsequently to be recovered from the blende, shall have to be subjected to the costly metal refining process.

The present invention constitutes a composite process consisting of at least three steps or parts when a lead-zinc material is treated not containing any silver or pyrites, each of the latter ingredients if present requiring a separate step or part, for its separation or recovery, so that for the treatment of a lead-zinc material containing also silver and pyrites the present process is accomplished in five separate steps or parts.

First step is a chloridizing operation for the sake of converting of all the lead and silver as well as the antimony and arsenic contained in the ore into chlorids and consists in adding to the ore such an amount of zinc chlorid or of any of its double salts that the chlorin of the zinc chlorid is equivalent to the sulfids of lead, silver, antimony and arsenic present in the ore, and by heating said admixture under exclusion of air to a temperature of about 400°–500° C. mixing or agitating the same in the course of this heating operation and allowing the volatilating chlorids of antimony and arsenic to escape and to separate from said admixture.

Second step consists in leaching out the chloridized mass of the first step for the purpose of extracting all the lead and silver chlorids (if silver is also present) and is accomplished by using preferably concentrated metal chlorid solutions which are good solvents for lead and silver chlorids and by taking special measures to prevent the reconversion of the lead and silver chlorids back into their insoluble sulfids (which invariably occurs when no measures are taken) so as to prevent losses in lead and silver as well as to prevent that the residual blende shall be contaminated with lead.

Third part of the process has for its object the recovery of the lead in a pure metallic and marketable form from the leached out lead chlorid by the use of metallic zinc (which may be partly replaced by the electric current) whereby the zinc chlorid used up in the first step is simultaneously recovered.

Fourth part of the process concerns the separation of the silver from its leaching solution if the ore treated contained also an appreciable amount of silver. To this part belongs also the regeneration in said leaching solution of the active chlorin which chlorin is necessary for the complete extraction of the silver from the ore and which being used up at each operation has to be regenerated each time.

Fifth or iron separation part of the process consists in a magnetic dressing of the blende left after the leaching operation in order to free it of most of its pyrites if the original ore treated contained such.

I am aware of the similarity which the present process has in common with the processes hitherto proposed first by myself and later by Thomas Twynam for about the same purpose, but I consider the present process (even when the same consists of only its first three and main parts) to be novel and distinguished from the said formerly suggested processes not only by its important practical results as the completeness of the lead recovery and the high purity of the resulting lead and blende which could not be attained till now but also by the different ways each single step or part of the present process has to be performed in order to attain these results and as far as the Twynam process is concerned also by the different character of the series of steps of which each process as a whole is composed of.

I will now proceed to describe every part or step of the process in detail, pointing out their characteristic features on which the mentioned practical results are dependent.

The first or chloridization step or part of the present process is based on the well known by myself long ago discovered reaction which takes place between the chlorids of some metals, particularly zinc chlorid with the sulfids of certain other metals as of silver, lead, antimony and arsenic. This reaction can be accomplished in practice in two ways, either by way of bringing the ore in a fused bath of zinc chlorid, in which case the reaction takes place in a fluid medium and the formed chlorids of silver, lead, antimony and arsenic are dissolved in the molten zinc chlorid, or the chloridization can be accomplished by heating the ore with only the equivalent amount of zinc chlorid in which case the reacting mass is in a solid and pulverulent state and the zinc chlorid reacts upon the sulfids particularly in the last stages of the reaction in a gaseous atmosphere and going itself over little by little into vapor due to the fact the vapor tension of the zinc chlorid is very high even at a temperature far below its boiling point.

This last way of chloridization which serves as the basis and first step of the present process is in many respects the more advantageous one. Apart from requiring much less zinc chlorid (in most cases ten to twenty times less) this way of chloridization takes place under certain conditions much quicker and more complete so that the lead and silver may subsequently be extracted quantitatively and any antimony or arsenic if present in the ore may moreover also under certain conditions be separated and removed in the course of the chloridization operation from the reacting mass, all these features not being attainable when the reaction takes place in a fused metal chlorid bath.

I have found however that even by using the gaseous way of chloridization the above mentioned advantageous features as completeness and quickness of the reaction, as well as the removal of the antimony and arsenic depend upon the following conditions:

Firstly: upon the correct amount of zinc chlorid added to the ore. If for example the zinc chlorid will be used only as much as required to chloridize the lead sulfid as suggested in the Twynam patent the silver sulfid and in cases where much antimony and arsenic are present in the ore even the lead sulfid itself may not be decomposed as I found that antimony and arsenic sulfids will first be chloridized and that only so much of the lead sulfid will be decomposed as there will be zinc chlorid in excess over that amount necessary for the chloridization of the arsenic and antimony and that the silver sulfid will be decomposed only after all the three mentioned sulfids of lead, antimony and arsenic have been decomposed.

Secondly: depend the completeness as well as the quickness of the chloridization upon the mixing or agitating of the mass or admixture while the same is heated; as I have found that the mixture if heated according to the direction of the Twynam patent in a closed retort or roaster or in any other vessel in which the charge is resting without agitation that then only small layers of the mixture near the heating surface will be completely chloridized and that in larger quantities of the mixture as would be required for working on a commercial scale the inner part of the mass is not completely chloridized and that moreover in such a case the chloridization takes place exceedingly slow. The reason for this phenomenon lays probably in the fact that at a temperature (400-500° C.) which is much lower than the boiling point of zinc chlorid (730° C.) the vapor tension of latter is not sufficient to penetrate into the inside of a thick layer of ore unless the gaseous atmosphere or the ore is thoroughly agitated and, Thirdly: depends the removal of the antimony and arsenic from the chloridized product upon the provision of some device in the chloridizing apparatus so as to admit the volatilizing chlorids of antimony and arsenic to escape from and settle outside of the reacting mass.

In carrying out this chloridizing operation I make use of an externally heated furnace such as the drum or tube illustrated in longitudinal vertical section in the accompanying drawing. Referring to this drawing it will be noted that the apparatus comprises a drum or cylinder 1 inclosed within a furnace structure and heated by any suitable means such as the gas burners 2. Within the drum is a rotating shaft 3 carrying stirrer blades 4 which are so arranged as to cause the material in the drum to be progressed from the inlet to the outlet thereof. The shaft and stirrers are suitably driven as by gearing 5 from any convenient source of power and at a speed appropriate for the reaction which takes place within the drum. The charge is fed into the drum from the hopper 6 by means of the worm 7 driven from the shaft 3. The material enters the drum through the inlet 8 and leaves the drum at outlet 9 at the opposite end which is sealed as shown by being connected to the chamber 10 so as to prevent access of air; a vent 11 is provided leading off volatile fumes, which may be sealed by having its outlet dropping below the level of a liquid in a vessel 12; a release valve 13 being provided in the vent pipe 11; a thermometer 14 is provided for indicating the temperature within the drum.

In such an apparatus, the mixture of ore and of zinc chlorid powder or of the crystals of zinc chlorid double salt is treated to effect the double conversion of the lead and silver sulfid and the sulfids of antimony and arsenic if same are present, into chlorids and the zinc chlorid into sulfid. There is no necessity of using an excess of zinc chlorid. It was found that even some deficiency in zinc chlorid would not prevent the subsequent quantitative extraction of the lead and silver. The reason for this is that there is always some zinc sulfate in the ore and some is always formed in the course of the chloridization operation which sulfate helps along in a direct or indirect way to convert the lead and silver into sulfates which are subsequently extracted by the concentrated metal chlorid solution.

The more suitable temperature for this operation is, in practice, from about 400° to 500° C. or higher.

The apparatus described is particularly advantageous in that it makes the chloridization operation a continuous one and permits heating of the mixture in an economical manner, the material being kept in the form of a stream which moves along the bottom of the apparatus where it is hottest, so that the heating of the charge is rapidly effected. While the simultaneous mixing and agitating of the charge is essential for the complete as well as for the rapid chloridization of the charge, and for making the operation a continuous one. The agitating prevents at the same time the bottom of the tube from burning through while some small amount of air which on account of the agitation may be introduced into or through the tube or drum does not interfere with and is in some respect even of benefit to this operation.

If the ore or metallurgical product to be chloridized contains the lead or silver or both in form of oxids, carbonates, arsenids, antimonids, or as native metal or in other non-sulfid form, the metals will not be chloridized by the zinc chlorid or only partly. In such a case the ore or product has to be sulfidized first by any well known means before it is subjected to the chloridization. I prefer to do this by means of heating the ore with sulfur or with a sulfur yielding material such as iron pyrites or with any other metal sulfid capable of transferring its sulfur to the metals of the ore. I prefer, however, to combine the sulfidizing and chloridizing of the ore into one operation by adding to the ore the necessary amount of sulfur or metal sulfid together with the equivalent amount of zinc chlorid and subjecting the admixture to the chloridization operation keeping the temperature preferably below 448° C. the boiling point of sulfur.

The second step of present process consists in leaching out of the pulverulent product resulting from its first step with the object of extracting all the chloridized lead and silver, if latter is also present in the ore.

I have found however that this object could not be attained by the methods hitherto proposed such as for example in the Twynam patent.

Experiments with lead-zinc ores have shown that even when all their lead and silver were chloridized that these chlorids could not be completely extracted by the mentioned methods, that the extraction of the lead chlorid has shown to be more or less variable but in no case quantitative, while the silver chlorid was generally not recoverable at all or only to a very small extent.

I have found that this is due to the fact that when the chlorids of lead and silver are brought into solution in the presence of zinc sulfid a portion of the lead chlorid and practically the whole of the silver chlorid are reconverted back into their insoluble sulfids by the reaction of the zinc sulfid present and are thus not removed by the leaching solutions.

The reversion into sulfids of the lead and silver chlorids has been found by me to be accelerated and considerably increased by the use of warm leaching solutions and is also increased by prolonging the period of contact between the ore and the leaching solution.

The precautions and measures to be taken for the purpose of preventing the reaction between the sulfids in the ore and the dissolved lead and silver chlorids may be either mechanical or chemical.

For example the aforesaid reaction may be hindered or minimized by carrying out the leaching operation under such conditions that the temperature is maintained as low as possible, such as by using very cold leaching solutions, and also by reducing the time of contact between the solutions and the leached mass to a minimum such as by carrying out the lixiviation by percolation through thin layers of material. Such precautions are against the general practice which in cases of extracting such very little soluble salts as lead and silver chlorid (and especially when the extraction proves not to be successful) uses the solvents as hot as possible and for so long a time as possible.

The mentioned mechanical means are however not very reliable and I prefer therefore to prevent the aforesaid undesirable reactions altogether in a chemical way by the addition to the leaching solution of such substances as will prohibit the same. For example the leaching solution (such as brine) may be acidified by the addition of from one-half to one per cent. of hydrochloric acid or of a suitable acid chlorid salt (such as aluminium chlorid) or I may add to the leaching solution a small proportion (from 2 to 4%) of zinc chlorid. This addition will prevent altogether the reaction of the zinc sulfid upon the lead chlorid. From the mentioned substances I prefer, however, the addition of zinc chlorid in which case the solution can be kept neutral or even basic, while for the simultaneous removal of both the lead and silver chlorids or of only silver chlorid I add to the leaching solutions substances which have a chloridizing or oxidizing effect upon sulfids such as cupric chlorid, ferric chlorid, or ferric sulfate or per-acids and the like. Such per-chlorids even when present in the leaching solution in a very small percentage and as long as they are present hinder altogether the sulfidization not only of the lead but also of the silver chlorids, while the above named plain chlorids as zinc chlorid cannot be used as preventive substances against the sulfidization of the silver chlorid. On the other hand it has to be borne in mind that while zinc chlorid serves only as a contact substance without having any action on the sulfids present in the ore the perchlorids react on these sulfids chloridizing the same, liberating hereby their active chlorin and going over in protochlorids or plain chlorids.

Further, the aforesaid reactions may also be hindered by treating the product preliminary to the leaching operation in such a way that the metal sulfids (such as zinc sulfid) contained therein are coated with a thin film of sulfur such as for example by treating the product previously to the leaching operation with a weak solution of ferric chlorid or cupric chlorid or by agitation of the mass with free sulfur. This film of sulfur isolates the metal sulfids of the mass and prevents them acting on the dissolved chlorids.

Or I may leach first the lead and silver or each of them separately without taking any precautions whatsoever and allow the whole or a part of same to be turned into sulfids and leach subsequently the residue with a solvent containing a per-chlorid or per-acid. I found that while the lead and silver sulfids in the original ores and metalliferous products are very difficult to extract with solvents containing per-chlorids (or, in other words the mentioned sulfids can be extracted only when the whole or the most of the zinc sulfid present in the ore is extracted along with them) the sulfids of lead and silver freshly formed from the chloridized product are of a particular nature and are very easily extracted by a perchlorid without that much of the blende is extracted along with them. The reason for this lies in the fact that the lead and silver being precipitated from their dissolved chlorids by the blende cover the whole of same with a very fine film of lead or silver sulfids which then present a large surface to the attacking per-chlorid and these freshly formed sulfids must, moreover, be first attacked before the blende can be attacked.

When the lixiviation is done by means of a solvent containing a perchlorid such as ferric chlorid it makes therefore practically no difference if the lead and silver are contained in the residue as chlorids or as sulfids formed from such chlorids. In both cases will they be equally easy extracted as long as the ferric chlorid is not used up entirely in the course of the leaching operation.

In carrying out the leaching operation constituting the second step of the process of present invention I use for extracting of only lead chlorid either water or preferably a concentrated, solution of a metal chlorid such as the chlorids of calcium magnesium or sodium (brine solution) and as a preventive measure against formation of lead sulfid either mechanical means as for example a very cold solution which is left for only a short time in contact with the ore or chemical means such as the addition of one of the mentioned preventive substances preferably, however 2 to 4% of zinc chlorid. The leaching solution may then be used hot or cold but in case I wish to obtain the lead chlorid in crystals the solution must always be used hot.

For the extraction of only silver chlorid I make use of any of its well known solvents taking as a preventive measure the mentioned mechanical means to which I count also the treatment of the chloridized product preliminary to the leaching operation for the sake of covering the blende with sulfur or I use as a leaching solution a conc. metal chlorid solution to which an addition of an active chlorid was made such as a per-chlorid preferably ferric chlorid.

The extraction of silver chlorid is done at all events preferably in the cold.

When both chlorids (of lead and silver) are present in the chloridized product I act in one of the following ways:

1. I leach out first the lead chlorid by water by using as a preventive measure either mechanical means or by using some zinc chlorid and I leach then the silver chlorid which is left back as such in the residue in the way given above for the extraction of only silver chlorid.

2. I leach out the first lead chlorid by means of a concentrated metal chlorid solution such as a brine solution containing some zinc chlorid using the same hot or cold but leaving the same so long in contact with the ore till all of the silver chlorid is converted into silver sulfid whereupon I leach the residue a second time with a concentrated metal chlorid solution to which a perchlorid such as ferric chlorid is added to convert the silver sulfid into silver chlorid and to simultaneously extract the same.

Instead however of extracting the lead and silver separate each from other I may extract both at the same time in which case I may do it in the following way.

3. I leach with a concentrated metal chlorid solution both chlorids together using as a preventive measure either mechanical means or ferric chlorid, using also in latter case the solution preferably in the cold so as not to cause a too great loss of its active chlorin, and finally 4. In all cases and particularly when silver is present I may leach first without taking any precautions whatever letting the lead and the silver partly or wholly to be converted into sulfids and extract the same subsequently by a cold concentrated metal chlorid solution to which ferric chlorid was added which serves at the same time as a chloridizing as well as a preventing substance.

From the perchlorids I use ferric chloric in preference to cupric chlorid because the presence of copper interferes with the subsequent recovery of the lead.

The active chlorin of the perchlorid is mostly used up in the leaching operation in dissolving some of the zinc sulfid present in the ore and forming anew a certain amount of zinc chlorid which is left in the leaching solution and can be recovered therefrom by evaporation, while its perchlorid or active chlorin contents disappears and has to be renewed at each cycle of the process.

The resulting products of the second part of the process are the residue and the leaching solutions. The latter are treated by the following third and eventually also fourth parts of the process while the residue which represents a blende free from lead, antimony and arsenic is very well adapted for the production of pure lead free zinc products or of a lead free zinc which moreover has not to be subjected to the usual zinc refining process. In case however this blende contains much pyrites it is then subjected to a further treatment by the so-called fifth part of present process.

It must be remarked however that while the first two steps of the process are more of a general and preliminary nature having to be applied to all kinds of ores treated by the present process independent of the particular character of these ores and having also to be applied in the indicated order and succession and before any other step can be undertaken the following three steps are more of a specific nature each serving for the separation or recovery of a certain ingredient as lead, silver or blende and must not necessarily succeed in the indicated order. They are numbered as third, fourth and fifth rather for the sake of convenience of description.

The third or lead separation part of the process which has for its object the recovery of lead from the extracted lead chlorid in a pure metallic and marketable form I may accomplish in two different ways:

In the one way I obtain first from the leaching solution the extracted lead chlorid in form of its crystals. I do this by making the leaching solution in use hot before the lixiviation. This renders the solution capable of taking up new quantities of lead chlorid and to separate the same as crystals when the solution is cooled to its previous temperature.

The so separated lead chlorid crystals are then dried and fed into a bath of molten zinc chlorid to which a certain amount of metallic lead has been added. Metallic zinc is then added to this bath which dissolves in the molten lead and reduces rapidly the lead chlorid to metallic lead, particularly when the bath is agitated. Successive additions of lead chlorid and metallic zinc are continuously made. The metallic lead is tapped off after an addition of lead chlorid was made and when the same is in excess and the zinc chlorid is tapped off after an addition of metallic zinc was made and when the same is being in excess, thereby obtaining two products, metallic lead free from zinc on the one hand and zinc chlorid free from lead chlorid on the other hand. The so obtained water free and neutral (pure from oxid) zinc chlorid is used in the first step of the process.

In the other way I reduce the lead chlorid direct from its leaching solution by treating the latter with metallic zinc whereby the lead separates in a spongy state while the equivalent amount of zinc chlorid is formed, and left in the solution.

The spongy lead has hitherto not been found to be readily convertible into commercial form but I have found that if the same is pressed into cakes and then fed into a bath of molten zinc chlorid it can be conveniently remelted and converted into a marketable product. The metallic lead obtained in present process by any of the both indicated ways is of high purity, being particularly free also from any antimony or arsenic and does not require therefore to be subject to the usual refining process.

The zinc chlorid obtained in solution is recovered therefrom by evaporation and is reused in the first step or in the chloridization operation. In case the zinc chlorid is obtained in a brine solution I recover the same in the form of its double salt with sodium chlorid. I have found that when a brine solution containing zinc chlorid is evaporated it first separates the excess of sodium chlorid contained in solution over and above that amount required for the double chlorid of zinc and sodium while this double salt being a very soluble salt is left in solution and is recovered therefrom by further and separate evaporation thereof to dryness after the separated excess of sodium chlorid has been removed. This double salt is very well adapted for the chloridization operation.

Instead however of separating the lead by metallic zinc the latter may be wholly or partly in both the above explained ways of lead separation replaced by the electric current in which case the zinc chlorid necessary for use in the first step of the process will not be simultaneously recovered with the lead but chlorin gas will be obtained instead. This chlorin may however be used for regenerating the active chlorin of the silver leaching solution in which case the so-used up chlorin is still finally turned into zinc chlorid which being recovered by evaporation from the leaching solution in the above indicated way is ready to be used in the first step of the process.

It may also be added that the above described two different ways of lead separation from the lead chlorid leaching solution may both be used at the same time, in such a manner that one part of the extracted lead chlorid may be separated in crystals while the other part may be reduced direct from the solution.

The fourth step or silver separation part of the process is used when ores are treated containing an appreciable amount of silver. We have seen that in such a case the first two steps of the process have to be adjusted or modified so that along and parallel with the chloridization and lixiviation of the lead also the complete chloridization and lixiviation of the recoverable silver is brought about. But the fourth step has for its object more especially the treatment of the leaching solution containing the extracted silver. In most of the cases the silver chlorid will be contained in the leaching solution together with more or less of lead chlorid as even when the silver chlorid is leached out separately after the lead chlorid has been leached out the second leaching solution will serve at the same time as a washing to the first leaching solution and will contain therefore some lead chlorid. But the silver can be obtained separately from the lead by precipitating the silver either direct with metallic lead or with any other metal as with zinc or iron which in their turn react on the lead chlorid separating a spongy lead and the latter will separate the silver. Or the silver may also be separated as sulfid from the concentrated metal chlorid solution such as a brine solution (in which some zinc chlorid is always present) by means of a metal sulfid such as lead sulfid, zinc sulfid, etc., as from such a solution only silver but no other metals will be precipitated as a sulfid. A part of the metal or the metal sulfid applied for precipitation of the silver will be used up for the reduction of some ferric chlorid which is always left over after the leaching solution if the same contained ferric chlorid as a preventive substance, while the main part of the ferric chlorid or rather of its active chlorin is used up in the leaching operation.

After the precipitated silver is separated from the solution the latter contains no active chlorin, the iron salt being all in the form of ferrous chlorid which has now to be chloridized by means of chlorin gas to ferric chlorid so as to return it to its previous strength in active chlorin and make it fit for use in the next cycle of the process.

The fifth or iron separation part of present process consists in a magnetic dressing of the residue left over after the second step of the process in order to extract and separate as much as possible the pyrites from the blende. This fifth step of the process is used in the treatment of such lead-zinc sulfid ores as are very often found in the United States and Mexico containing much pyrites not easily and expediently separable from the body of the ore. Such ores even if freed from their lead contents yield a very inferior blende.

The separation of the pyrites from the residue according to present process is based on the novel and surprising observation that the pyrites in the said residue after the same have gone through the first two steps of the process show to be much more magnetic than the same were in the original ore, while the blende particles show to have lost at the same time much of their original magnetic property.

A magnetic dressing of the said residue has shown therefore to yield two products, a blende and a pyrite-ore, both products of good value not otherwise obtainable in such an easy manner.

Having now fully described my invention and the manner in which the same is to be performed what I claim is:

1. A process of treatment lead-zinc sulfid ores and metallurgical products consisting of adding to the said ores an equivalent amount of metal chlorid corresponding to the sulfid of lead (as well as of any arsenic and antimony which may also be present in the ore) feeding the said admixture into a closed and continuously operating furnace heating mixing and progressing the said admixture therethrough and leaching out the formed chlorid of lead from the resultant pulverulent product taking precautions to prevent the reaction between the metal sulfids contained in the said product and the said dissolved lead chlorid and recovering the lead in a pure metallic state from the said lead chlorid substantially as described.

2. A process of treatment lead-zinc sulfid ores and metallurgical products containing also silver consisting of adding to the said products an equivalent amount of metal chlorid corresponding to the sulfids of silver, lead, antimony and arsenic present, feeding the said admixture into a closed and continuously operating furnace, heating mixing and progressing the said admixture therethrough and leaching out the formed lead and silver chlorids from the resultant pulverulent product taking precautions to prevent the sulfidization of said lead and silver chlorids and separating the lead and silver from the leaching solution recovering the lead in a pure metallic state substantially as described.

3. A process for recovery of a pure blende from complex lead-zinc sulfid ores containing also pyrites consisting of adding to the said ore an equivalent amount of zinc chlorid corresponding to the sulfid of lead as well as silver, antimony, and arsenic which may also be present in the ore, feeding the said admixture into and continuously operating furnace heating, mixing and progressing said admixture therethrough and leaching out the formed lead chlorid from the resultant product taking precautions to prevent the formation of lead sulfid from the lead chlorid and subjecting the resulting blende to a magnetic dressing substantially as described.

4. A process of treatment non-sulfid lead-zinc ores and metallurgical products consisting of adding to the said ores together with the equivalent amount of zinc chlorid corresponding to the lead, silver, antimony and arsenic also sulfur or a metal sulfid capable of sulfidizing the lead and silver present in the ore, heating and mixing said admixture to form chlorids of lead and silver and leaching out the formed chlorids of lead and silver from the resultant product taking precautions to prevent their sulfidization substantially as described.

5. A process of treatment lead-zinc sulfid ores and metallurgical products consisting of adding to the said ores or products an equivalent amount of metal chlorid such as zinc chlorid required for the chloridization of the lead and silver sulfids feeding the said admixture into a closed and continuously operating furnace heating, mixing and progressing the said admixture therethrough allowing the resultant product to cool and leaching the said product with a cold solvent solution (such as brine) to extract the lead and silver chlorids present, the leaching operations being effected in such a way that the pregnant solution is left in contact with the leached mass for a minimum amount of time, separating the lead and silver from the extracted chlorids recovering the lead in a pure metallic state substantially as described.

6. A process of treatment lead-zinc sulfid ores and metallurgical products consisting of adding to the said ores an equivalent amount of metal chlorid such as zinc chlorid required for the chloridization of the lead and silver sulfids as well as of any arsenic and antimony which may also be present in the ore feeding said admixture into a closed and continuously operating furnace heating mixing and progressing the mixture therethrough leaching out from the resultant pulverulent product first the lead chlorid with water and then the silver chlorid in the cold with a suitable solvent leaving the same in contact with the leached mass for a minimum amount of time and recovering the lead and silver from the respective solutions separating the lead in a pure metallic state substantially as described.

7. A process of treatment lead-zinc sulfid ores and metallurgical products consisting of adding to the said material an equivalent amount of metal chlorid such as zinc chlorid required for the chloridization of the lead and silver sulfids as well as any arsenic and antimony which may also be present in the ore heating such admixture without access to air treating the resultant mass to cover the particles of metallic sulfids therein with a thin film of sulfur and leaching out the chlorids of lead and silver from the resultant mass with suitable solvents and recovering the lead and silver from the said solvents substantially as described.

8. A process for treatment lead and silver sulfid ores and metallurgical products consisting of adding to the said ores an equivalent amount of metal chlorid such as zinc chlorid required for the chloridization of the lead and silver sulfids in the ore (as well as any arsenic and antimony which may also be present) heating and agitating such admixture without access of air leaching out the lead and silver chlorids from the resultant product with a solvent containing substances which prevent the reversion of lead and silver chlorids into sulfids by the reaction of the metal sulfids in the said product on the said dissolved chlorids and recovering the lead and silver from the leaching solutions separating the lead from the lead chlorid in a pure metallic state substantially as described.

9. A process for the recovery of lead from sulfid ores and metallurgical products consisting of adding to the said ores an equivalent amount of metal chlorid such as zinc chlorid required for the chloridization of the lead sulfid in the ore heating and mixing such admixture without access to air and leaching out the lead chlorid from the resultant product with a solvent solution being sufficiently acidified or containing sufficient zinc chlorid to prevent the reversion of lead chlorid into sulfid and recovering the lead from said lead chlorid in a pure metallic state substantially as described.

10. A method for the recovery of lead and silver from sulfid ores and metallurgical products consisting of adding to the said ores an equivalent amount of metal chlorid such as zinc chlorid required for the chloridization of the lead and silver sulfids in the ore heating such admixture without access to air leaching out the lead and silver chlorids from the resultant product with a solvent solution containing a reagent which has a chloridizing or oxidizing effect on sufids and recovering the lead and silver from the said leached chlorids substantially as described.

11. A method for the recovery of lead and silver from sulfid ores and metallurgical products consisting of adding to the said ores an equivalent amount of metal chlorid such as zinc chlorid required for the chloridization of the lead and silver sulfids in the ore heating such admixtures without access of air, then removing the lead chlorid by lixiviation with a solvent solution containing zinc chlorid under such conditions that the silver chlorid reverts to sulfid then separately removing the silver by means of a solvent solution containing a reagent which has a chloridizing or oxidizing effect on the silver sulfid (such as cupric chlorid or ferric chlorid) substantially as described.

12. A method for the recovery of lead and silver from sulfid ores and metallurgical products containing the same consisting of mixing the said ores with approximately an equivalent quantity of zinc chlorid required for the chloridization of the lead and silver sulfids and heating such admixture without access to air for the production of a mass containing lead and silver chlorids removing the said lead and silver chlorids from the resultant mass by means of lixiviation with a solvent containing ferric chlorid and thereby preventing the reversion of the said chlorids into sulfids substantially as hereinbefore described.

13. A method for the recovery of lead and silver from sulfid ores and metallurgical products consisting of adding to the said ores an equivalent amount of metal chlorid such as zinc chlorid required for the chloridization of the lead and silver sulfids in the ore heating and mixing the said admixture without access to air then removing the lead and silver chlorids by lixiviation with any suitable solvent without taking any precautions for the prevention of the reversion of the said lead and silver chlorids to sulfids and finally treating the residue with a solvent containing a reagent which has a chloridizing or oxidizing effect on the sulfids of silver and lead and extracting said lead and silver left back in the residue substantially as described.

14. In the treatment of ores and metallurgical products containing lead and silver in a non-sulfid form, the method of chloridization of said lead and silver consisting in adding to such ores and products together with the necessary amount of zinc chlorid also sulfur in a suitable form in order to sulfidize the lead and silver present in the ore agitating and heating such admixture in a closed furnace substantially as described.

15. In the treatment of lead sulfid ores as set out the method of recovering from the lead chlorid zinc free lead with simultaneous regeneration of the zinc chlorid used therein consisting of removing the said lead chlorid formed with a hot solvent solution cooling the solution to crystallize out the dissolved lead chlorid, melting the said crystals of lead chlorid in a molten bath of zinc chlorid containing also molten lead into which metallic zinc is introduced thereby reducing the lead chlorid to metallic lead and zinc chlorid tapping off the recovered lead when there is an excess of lead chlorid and tapping off the zinc chlorid when there is an excess of metallic zinc substantially as hereinbefore described.

16. In the recovery of lead and silver from sulfid ores containing the same as set out a method of regenerating the double chlorid of zinc and sodium from solutions containing an excess of sodium chlorid obtained as hereinbefore set out consisting of evaporating such a solution until the excess of sodium chlorid is thrown down leaving the double salt of sodium and zinc in solution then evaporating to separate out the said double salt which may be reused in the chloridization operation.

17. In the treatment of lead sulfid ores as set out the method of transforming the spongy metallic lead obtained in the process in a marketable form by remelting the same from a molten bath containing zinc chlorid substantially as described.

In testimony whereof I have signed my name to this specification, in the presence of two subscribing witnesses.

SOLOMON GANELIN.

Witnesses:
GEORGE L. BLUME,
LEONARD HANERSTEIN.